US009692506B2

(12) United States Patent
Kohanek et al.

(10) Patent No.: US 9,692,506 B2
(45) Date of Patent: Jun. 27, 2017

(54) INFRARED REPEATER

(71) Applicant: Universal Electronics Inc., Santa Ana, CA (US)

(72) Inventors: Jeffrey Kohanek, Westminster, CA (US); Lou Hughes, San Diego, CA (US); Cesar Alvarado, Brea, CA (US); Rex Xu, Tustin, CA (US)

(73) Assignee: Universal Electronics Inc., Santa Ana, CA (US)

( * ) Notice: Subject to any disclaimer, the term of this patent is extended or adjusted under 35 U.S.C. 154(b) by 35 days.

(21) Appl. No.: 14/584,409

(22) Filed: Dec. 29, 2014

(65) Prior Publication Data

US 2015/0207566 A1    Jul. 23, 2015

Related U.S. Application Data

(60) Provisional application No. 61/921,900, filed on Dec. 30, 2013.

(51) Int. Cl.
*H04B 10/00* (2013.01)
*H04B 10/114* (2013.01)
*G08C 23/04* (2006.01)

(52) U.S. Cl.
CPC ......... *H04B 10/1143* (2013.01); *G08C 23/04* (2013.01); *G08C 2201/40* (2013.01)

(58) Field of Classification Search
CPC . G08C 2201/40; G08C 23/04; H04B 10/1143
USPC ................................................ 398/118–131
See application file for complete search history.

(56) References Cited

U.S. PATENT DOCUMENTS

| 4,727,600 | A | * | 2/1988 | Avakian | H04B 10/1149 398/115 |
|---|---|---|---|---|---|
| 4,809,257 | A | * | 2/1989 | Gantenbein | H04B 10/1149 398/128 |
| 5,164,707 | A | * | 11/1992 | Rasmussen | F16P 3/14 250/221 |
| 5,218,356 | A | * | 6/1993 | Knapp | H04B 10/1149 342/350 |
| 5,241,410 | A | * | 8/1993 | Streck | H04M 1/737 379/56.3 |
| 5,349,463 | A | * | 9/1994 | Hirohashi | H04B 10/1149 375/211 |
| 5,363,229 | A | * | 11/1994 | Sakurai | H04B 10/1149 398/119 |
| 5,545,891 | A | * | 8/1996 | Smith | G08B 29/185 250/214 AL |
| 5,602,664 | A | * | 2/1997 | Doyle | H04B 10/29 340/12.11 |

(Continued)

OTHER PUBLICATIONS

ISA/US, International Search Report and Written Opinion issued on PCT Application No. US14/72673, date of mailing Apr. 22, 2015, 9 pages.

*Primary Examiner* — Agustin Bello
(74) *Attorney, Agent, or Firm* — Greenberg Traurig, LLP

(57) ABSTRACT

An IR repeater includes a receiver portion for receiving an IR light signal representing a coded command modulated by a modulating signal and a transmitter portion, electrically coupled to the receiver portion to generate an IR light signal corresponding to the coded signal received by the receiver portion. A mounting structure mounts the receiver portion outside an opaque object and mounts the transmitter portion inside the opaque object.

11 Claims, 3 Drawing Sheets

(56) References Cited

U.S. PATENT DOCUMENTS

| | | | | |
|---|---|---|---|---|
| 5,625,883 | A * | 4/1997 | Leyten | H04B 1/20 336/232 |
| 6,111,677 | A * | 8/2000 | Shintani | H04B 10/114 340/12.22 |
| 6,222,657 | B1 * | 4/2001 | Fujino | H04B 10/1143 398/129 |
| 6,907,013 | B1 * | 6/2005 | Ruziak | H04B 1/202 370/277 |
| 6,963,305 | B2 * | 11/2005 | Knapp | H01Q 1/1285 333/230 |
| 7,194,209 | B1 * | 3/2007 | Robbins | H04B 10/29 398/127 |
| 7,228,074 | B2 * | 6/2007 | Devine, III | H04B 10/114 398/106 |
| 7,266,301 | B2 * | 9/2007 | Stanchfield | H04B 10/1143 398/106 |
| 7,668,503 | B1 | 2/2010 | Schumann et al. | |
| 8,401,395 | B2 * | 3/2013 | Xia | H04B 10/11 398/118 |
| 8,634,720 | B2 * | 1/2014 | Petricoin, Jr. | G08C 17/00 398/126 |
| 8,971,796 | B2 * | 3/2015 | Judd | G01S 19/25 455/11.1 |
| 2003/0020645 | A1 | 1/2003 | Akiyama | |
| 2005/0025495 | A1 | 2/2005 | Devine, III et al. | |
| 2009/0060514 | A1 | 3/2009 | Dichiro et al. | |
| 2010/0258729 | A1 | 10/2010 | Roxburgh et al. | |
| 2013/0130620 | A1 | 5/2013 | Judd et al. | |
| 2015/0207566 | A1 * | 7/2015 | Kohanek | H04B 10/1143 398/126 |

* cited by examiner

INFRARED REPEATER

CROSS REFERENCE TO RELATED APPLICATION

This application is a non-provisional application claiming priority to provisional application Ser. No. 61/921,900 filed on Dec. 30, 2013, and incorporated herein by reference in its entirety.

FIELD OF THE DISCLOSURE

The present description relates generally to an infrared repeater and more particularly to an infrared repeater that may be supported for transmitting an infrared signal behind an obstacle.

BACKGROUND OF RELATED ART

Current wireless remote control units for consumer electronic equipment, such as stereo equipment, television receivers, DVD and/or blu-ray equipment, and cable or satellite receiver boxes, oftentimes operate by transmitting an infrared (IR) light signal, or other suitable signal, representing a coded command modulated on a modulating signal, from the remote control unit to the consumer electronic equipment. This modulated IR light signal is received by an IR receiver in the consumer electronic equipment, demodulated, decoded, and the appropriate action taken. IR remote control units are generally line-of-sight devices, meaning that any consumer electronic equipment which is in a shadow with respect to the IR light generated by the remote control unit will not be able to receive the IR light signal and respond to the command.

Currently, however, consumer electronic equipment is oftentimes placed inside a piece of furniture, such as shelving, cabinetry, walls, etc. and more specifically, the equipment is oftentimes placed behind a solid door to hide the object from the room for aesthetic purposes. For example, a television, cable box, satellite receiver, etc., may be placed in a home entertainment cabinet in such a manner that the cable box, satellite receiver, blu-ray player, etc. are placed behind a solid door, etc, such that the IR light generated by remote control units cannot penetrate through the obstacle such that the hidden or remotely located equipment may not be receive the IR light signal in sufficient intensity to be controlled.

To provide the capability of controlling consumer electronic equipment within cabinets, IR repeaters have been developed. An IR repeater typically includes an IR receiver section located where it can receive the coded modulated IR signal generated by the remote control unit. For example, it may be located on the outside of an entertainment unit or in the room in which the remote control unit is being used. The IR receiver section is typically connected to an IR transmitter section located where the consumer electronic equipment, which is to be controlled, can receive the IR transmitter signal. For example, the IR transmitter section is typically located inside of the entertainment unit in which the consumer electronic equipment is located. The IR transmitter section includes an IR light emitter which is placed so that the emitted IR light impinges on the IR receiver in the consumer electronic equipment to be controlled. More specifically, the IR light emitter is usually placed directly adjacent to the IR receiver in the consumer electronic equipment. The IR receiver section of the IR repeater detects the coded IR light signals produced by the remote control unit and transmits them to the IR transmitter section, usually via a wire. Usually, the IR transmitter section generates an IR light signal which is identical to the IR light signal received by the IR receiver section. The consumer electronic equipment then receives this IR light signal from the IR transmitter section, and performs the desired function as if receiving the command directly from the remote.

For example, U.S. Pat. No. 5,602,664 describes an IR repeater including a receiver section for receiving an IR light signal representing a coded command modulated by a modulating signal, and for detecting the coded signal. An oscillator generates a transmitter modulating signal, and a transmitter section, coupled to the receiver section and the oscillator, generates an IR light signal representing the detected coded command modulated by the transmitter modulating signal.

While IR repeaters may be known in the art, mounting and/or locating IR repeater components typically requires a consumer to physically attach at least a portion of the repeater to certain surfaces. For example, a typical IR repeater installation may require the mounting of the IR receiver portion on a wall and/or flat surface, such as the entertainment cabinet, such that the IR receiver is within sight of the remote control. The consumer must also typically mount the IR transmitter within sight of the electronic equipment, such as inside the cabinetry containing the electronic equipment, and also hide and/or locate the wires extending between the IR receiver and the IR transmitter. This installation may scar and/or damage the mounting surfaces, and may be complicated for some consumers.

Therefore, there is a demonstrated need for an IR repeater that is easy to mount and/or locate such that an IR signal may be easily transmitted behind an obstacle such as a solid door.

DETAILED DESCRIPTION

The following description of various example apparatus is not intended to limit the scope of the description to the precise form or forms detailed herein. Instead the following description is intended to be illustrative so that others may follow its teachings.

The present disclosure is directed toward an example IR repeater having a relatively compact design, allowing for the infrared (IR) repeater to be mounted over a supporting structure, such as for instance, a cabinet door. It will be appreciated by one of ordinary skill in the art that while the present examples are described in relation to IR technology, any known and/or suitable wireless transmission technology, such as, for example radio frequency (RF) may be utilized as desired.

Figure 1:
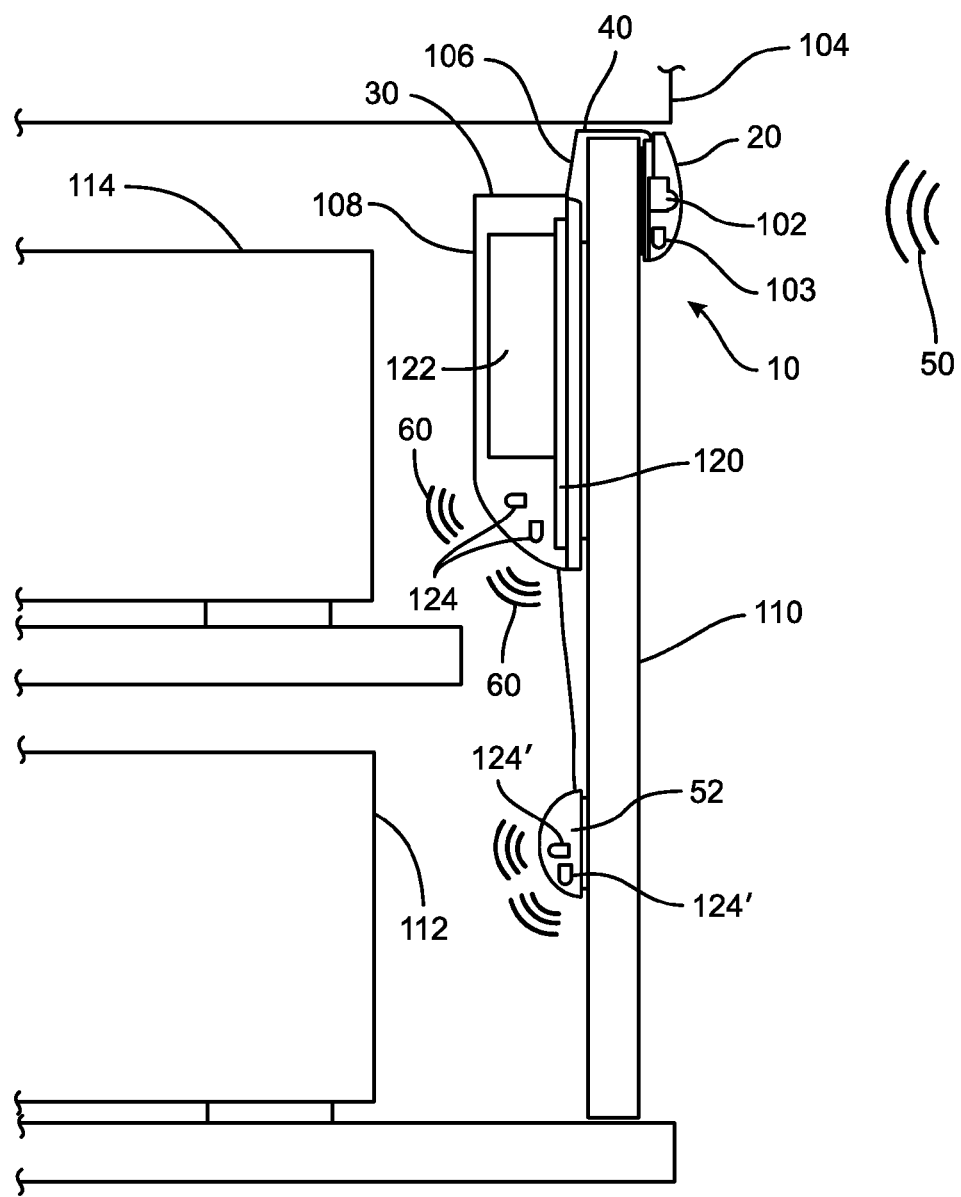
FIG. 1 is a cross-sectional view of an example IR repeater installed over a door of an entertainment cabinet.

Referring now to FIG. 1, an example IR repeater 10 comprises, in general, an IR receiver portion 20 and a IR transmitter portion 30 (e.g., a IR blaster). The example IR receiver portion 20 is electrically and mechanically coupled to the IR transmitter portion 30 via a cable 40, which in this example is an electrical ribbon-type cable. In this example, the cable 40 provides both electrical connectivity between the IR receiver portion 20 and the IR transmitter portion 30, and a physical support (e.g., a hanger) for the IR repeater 10 as will be described in greater detail below.

In general, a remote control unit (not shown) provides coded control signals modulated on an IR light signal 50 to an IR light detector 102 of the IR receiver portion 20 of the IR repeater 10. The IR light detector 102 may be any suitable IR detector, including, for instance, an IR phototransistor. In some instances, the IR receiver portion 20 may also include a feedback transmitter 103, such as an IR light emitting diode (LED), or other suitable device.

The example IR transmitter portion 30 comprises a controller 120, for example a printed circuit board (PCB), a power supply 122 (e.g., batteries), and at least one IR light emitter (e.g., an IR blaster) 124. The IR light emitter 124 is arranged to produce an IR light signal 60 corresponding to the IR signal 50 received at the IR receiver portion 20. In the example of FIG. 1, the IR light emitter is illustrated as an IR light emitting diode (LED), although any suitable emitting device may be used. The IR light emitter 124 is placed so that the IR light emitted by the IR light emitter 124 is visible by a piece of consumer electronic equipment 112, 114 housed with an audio-visual unit 104, such as an AV cabinet. To ensure coverage within the AV cabinet 104, the IR transmitter portion 30 may optionally include one or more IR extensions 52 comprising at least one additional IR light emitter 124'. It will be appreciated by one of ordinary skill in the art that the AV cabinet 104 may include a door 110 or other suitable access panel, which in this instance is solid or otherwise opaque.

As noted above and as illustrated in FIG. 1 and FIG. 2, the example IR receiver portion 20 is electrically and mechanically coupled to the IR transmitter portion 30 via the cable 40, which in this example is an electrical ribbon-type cable. The cable 40 is sufficiently thin so as to be extendable in the "gap" between the door 110 and the AV cabinet 104 (see FIG. 2). In this instance, the example cable 40 is of sufficient length to extend the width of the door 110 and to "hang" or otherwise support the IR receiver portion 20 on the outside of the AV unit 104 while supporting the IR transmitter portion 30 on the inside of the AV unit 104. It will be appreciated by one of ordinary skill in the art that the cable 40 may, as in this example, include the integral function of eclectically coupling the IR receiver portion 20 and the IR transmitting portion 30 and physically supporting the IR repeater 10 on the AV unit 104, or alternatively, include a separate support structure to mount the IR repeater 10 to the AV unit 104. For example, the IR repeater 10 may be mounted to the AV unit via any of: an adhesive element (for example an adhesive mounting strip 210) placed on the cable 104 and/or the IR repeater 10 to secure the unit; magnets applied to the IR repeater 10 and which may connect the receiver portion 20 to the transmitter portion 30; a counter balance; a hook or other suitable hanger; a structure, such as a malleable structure that may be formed by the installer; hook and loop; or any other suitable support structure.

In operation, the remote control unit (not shown) produces a coded modulated IR light signal 50. This signal 50 is detected by the IR light detector 102, which generates an electrical signal representing the coded modulated signal, and supplies that signal to the controller 120 of the IR transmitter portion 30. The IR transmitter portion 30 may condition and/or otherwise configure the signal to drive the IR light emitter 124 so that it produces an IR light signal 60 corresponding to this modulated signal, thereby repeating the received signal 50.

Figure 2:
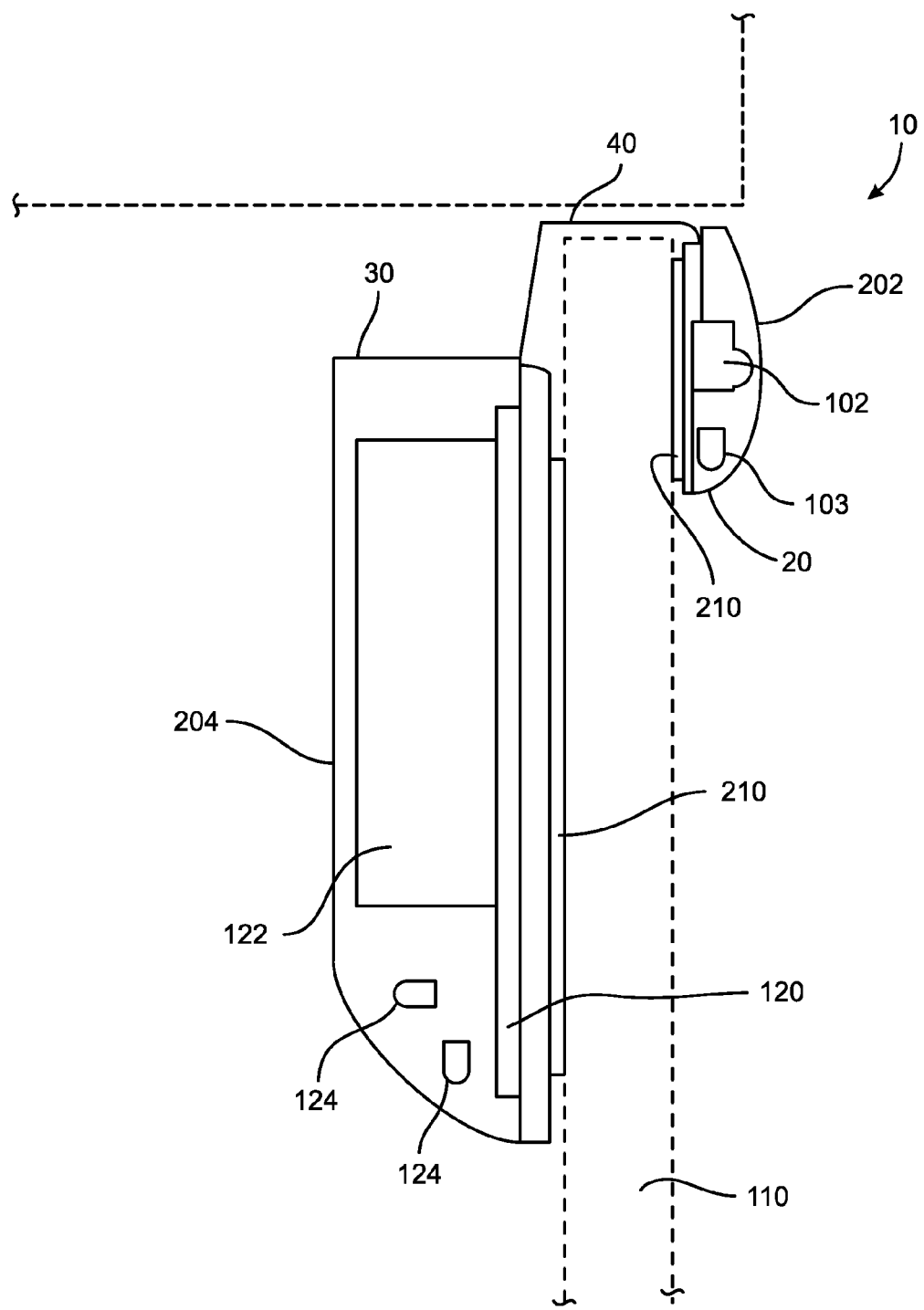
FIG. 2 is an enlarged cross-sectional view of the example IR repeater of FIG. 1.
Figure 3A:
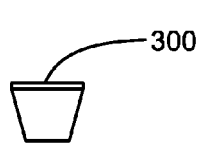
FIG. 3 is an illustration of some of the outer surfaces of various components of the example IR repeater of FIG. 1.
Figure 3B:
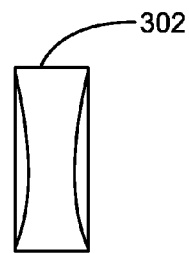
Figure 3C:
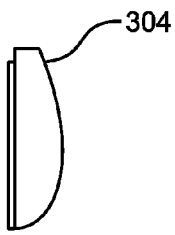
Figure 3D:
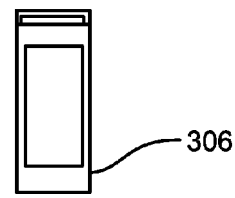
Figure 3E:
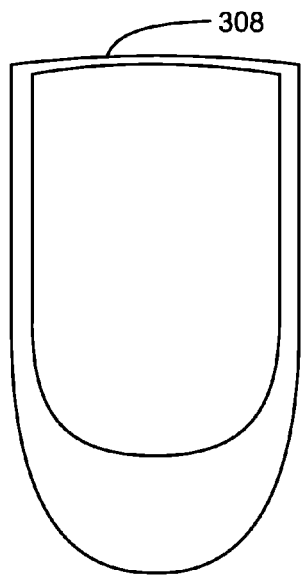
Figure 3F:
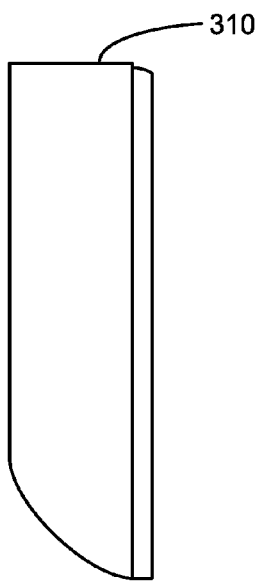

FIG. 2 illustrates an enlarged cross-sectional view of the example IR repeater 10 of FIG. 1, wherein an IR receiver portion 202 is coupled to an IR transmitter portion 204 via a cable 206. The cable 206 extends over the door 110 of an AV cabinet. In this illustration, both the IR receiver portion 202 and the IR transmitter portion 204 are mounted to their respective surfaces of the door 208 via the adhesive mounting strip 210.

Referring to FIG. 3, there is illustrated various views of an example IR receiver portion, and an example IR transmitter portion. For instance FIG. 3 includes a top plan view 300, a front view 302, a side elevation view 304, and a rear elevation view 306 of the IR receiver portion. FIG. 3 also illustrates a front elevational view 308 and a side elevational view 310 of the IR transmitter portion.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A repeater comprising:
    a receiver housing, for receiving an input signal representing a coded command modulated by a modulating signal;
    a transmitter housing, for generating an output signal corresponding to the received input signal, the transmitter housing being separate from and remotely located relative to the receiver housing; and
    a flexible mounting structure directly mechanically and electrically coupling the receiver housing to the transmitter housing and the flexible mounting structure configured to mount the receiver housing on a first side of an opaque object and mount the transmitter housing on a second side of the opaque object,
    wherein the flexible mounting structure is integrally formed with the electrical coupling, and
    wherein the flexible mounting structure is external to both the receiver housing and the transmitter housing, and
    wherein the flexible mounting structure is devoid of a rigid portion and is configured to extend over and to hang from the opaque object and to conform to the shape of the opaque object such that the receiver housing lies flush against the first side of the opaque object and such that the transmitter housing lies flush against the second side of the opaque object.

2. A repeater as recited in claim 1, wherein the electrical coupling is a cable ribbon.

3. A repeater as recited in claim 1, wherein the input signal is an infrared signal.

4. A repeater as recited in claim 1, wherein the output signal is an infrared signal.

5. A repeater as recited in claim 1, further comprising an extension transmitter portion distally located from the transmitter housing, the extension transmitter portion being located to produce an extended output signal on the second side of the opaque object.

6. A repeater as recited in claim 1, wherein the opaque object is a door.

7. A repeater as recited in claim 1, wherein the transmitter portion comprises a plurality of signal transmitters.

8. An infrared repeater comprising:
    a receiver portion comprising a housing and at least one infrared receiver disposed within the housing of the receiver portion;

a transmitter portion comprising a housing and at least one infrared transmitter disposed within the housing of the transmitter portion, the transmitter portion being separate from and remotely located relative to the receiver portion; and a flexible cable for directly electrically coupling and mechanically coupling the receiver portion and the transmitter portion without a rigid support, the flexible cable extending external to the housing of both the receiver portion and the transmitter portion, wherein the flexible cable further provides physical support for both the receiver portion and the transmitter portion over at least a portion of an object, and wherein the flexible cable is configured to extend over and to hang from the object and to conform to the shape of the object such that the housing of the receiver portion lies flush against a first side of the object and such that the housing of the transmitter portion lies flush against a second side of the opaque object, wherein the receiver portion is configured to receive an input infrared light signal on one side of the object and the transmitter portion is configured to transmit an output infrared light signal on a second side of the object.

9. An infrared repeater as recited in claim 8, wherein the flexible cable is a cable ribbon.

10. An infrared repeater as recited in claim 8, further comprising an extension transmitter portion distally located from the transmitter portion, the extension transmitter portion comprising a housing and at least one infrared transmitter disposed within the extension transmitter housing, wherein the extension transmitter portion produces an extended output signal on the second side of the object.

11. An infrared repeater as recited in claim 8, wherein the object is non-transmissive of an infrared light signal.

* * * * *